United States Patent [19]
Gute

[11] Patent Number: 5,280,988
[45] Date of Patent: Jan. 25, 1994

[54] MULTI-PIVOTING ARRANGEMENT FOR VISOR

[75] Inventor: Robert M. Gute, Corunna, Mich.

[73] Assignee: Plasta Fiber Industries Corp., Marlette, Mich.

[21] Appl. No.: 975,094

[22] Filed: Nov. 12, 1992

[51] Int. Cl.⁵ .............................................. B60J 3/02
[52] U.S. Cl. ............................ 296/97.9; 296/97.12
[58] Field of Search ............... 296/97.9, 97.12, 97.13

[56] References Cited

U.S. PATENT DOCUMENTS

| | | | |
|---|---|---|---|
| 2,965,415 | 12/1960 | Dryden | 296/97.13 |
| 3,825,296 | 7/1974 | Peterson | 296/97 D |
| 4,148,519 | 4/1979 | Hollar, Jr. | 296/97 |
| 4,176,875 | 12/1979 | Dow | 296/97 |
| 4,489,974 | 12/1984 | Warhol | 296/97 K |
| 4,610,477 | 9/1986 | Ebert et al. | 296/97 |
| 4,925,233 | 8/1990 | Clark | 296/97.11 |
| 5,011,211 | 4/1991 | Svensson | 296/97.1 |
| 5,011,213 | 4/1991 | Zweigart et al. | 296/97.13 |

Primary Examiner—Robert R. Song
Attorney, Agent, or Firm—Brooks & Kushman

[57] ABSTRACT

A mounting system for use in combination with a vehicle visor which is movable between a storage position and first and second use positions. A mounting bracket is provided which is adapted to be affixed to the vehicle for supporting the visor. The mounting bracket has an immovable pivot shaft extending therefrom. A block cooperating with the mounting bracket is provided to enable pivotal movement of the block and the visor relative to the pivot shaft between a storage position and a first use position. The block also enables pivotal movement of the visor relative to the block between the first use position and a second use position.

19 Claims, 3 Drawing Sheets

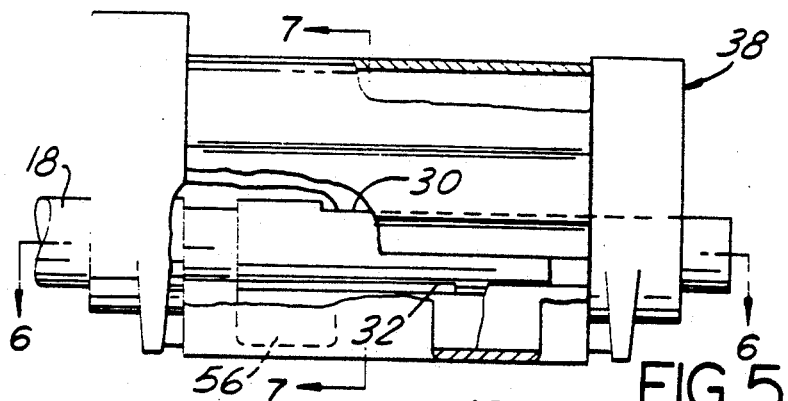
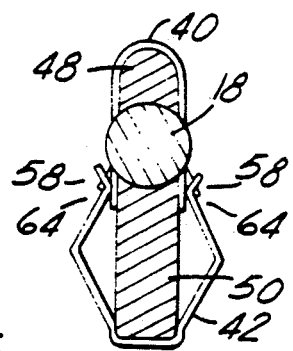
FIG. 5
FIG. 7
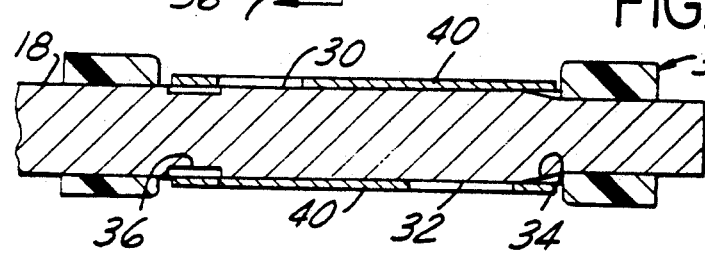
FIG. 6
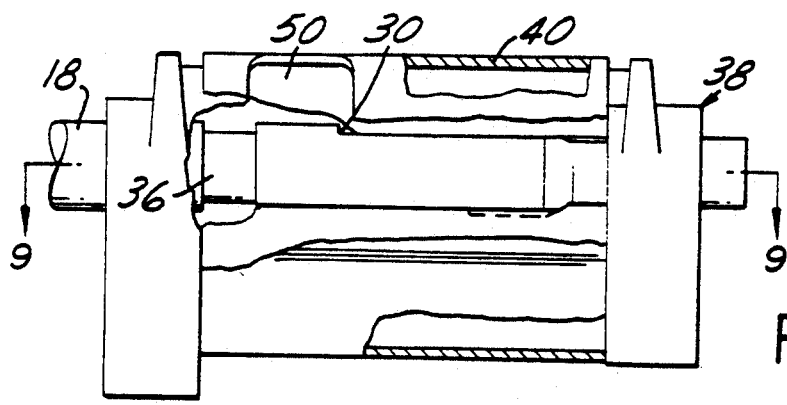
FIG. 8
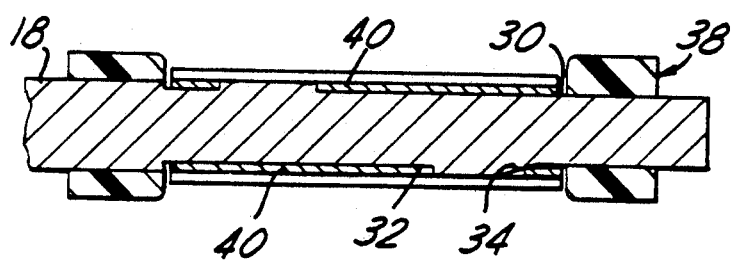
FIG. 9

MULTI-PIVOTING ARRANGEMENT FOR VISOR

TECHNICAL FIELD

This invention relates to visors, and in particular, to a multiple pivoting mounting system for a visor.

BACKGROUND ART

Sun visors have been standard equipment on motor vehicles for many years. Generally, these visors are mounted to the upper interior surface of a vehicle by a mounting bracket, which secures the visor to the upper outside corner of the driver/passenger's compartment. Conventional visors may be pivoted from a retracted storage position overlaying the headliner of a vehicle to a lowered use position overlaying the windshield. In addition, the visor may be pivotable between the lowered use position overlaying the windshield to a side position overlaying an adjacent side window.

Traditionally, visors have been pivotable in a first plane about the pivot shaft between the retracted storage position and the extended use position. Visors have also been pivotable about a second plane between the windshield and the adjacent side window by pivoting with the pivot shaft relative to the mounting bracket. Examples of this approach to pivoting in a first and second plane may be seen in U.S. Pat. Nos. 3,825,926, 4,148,519, 4,610,477, 4,489,974, 4,925,233, 5,011,211 and 5,011,213.

An alternative approach is disclosed in U.S. Pat. No. 4,176,875 to Dow which utilizes a conventional mounting bracket having a pivot shaft which is pivoted in a first plane between the windshield and an adjacent side window. A pivot member is attached to the pivot shaft. The pivot member has a second pivot shaft support rod about which the visor may be pivoted in a second plane between the retracted storage position and the extended use position. The pivot member also pivots in a third plane about an axis generally perpendicular to the support rod. In this configuration, a pivot member having an additional support rod is attached to an existing mounting bracket having a pivot shaft to provide an additional degree of freedom about which the visor may rotate.

The present invention is directed to improving known mounting systems for use with vehicle visors.

SUMMARY OF THE INVENTION

A mounting system is provided for use in combination with a vehicle visor movable between a storage position and first and second use positions. A mounting bracket is provided which is adapted to be affixed to the vehicle for supporting the visor. The mounting bracket has an immovable pivot shaft extending therefrom. A block is provided which cooperates with the mounting bracket to enable pivotal movement of the block and the visor relative to the pivot shaft between a storage position and a first use position. The block also enables pivotal movement of the visor relative to the block between the first use position and the second use position.

Another object of the present invention is to provide a mounting system for use in combination with a vehicle visor. A visor is provided which has a cut-out located therein such that the cut-out defines a bore. A pivot shaft is provided having a generally circular cross section. The shaft cooperates with the visor such that the shaft has a flat surface located on one side of the shaft which provides a detent position for locating the visor in a storage position. A first clip is provided which cooperates with the shaft and the visor. The first clip has a first leg and a second leg, one of the first and the second legs defines a cut-away cooperating with the flat surface to locate the flat surface to obtain the detent position when the visor is in the storage position. A second clip is provided which cooperates with the first clip to securely fasten the first clip about the pivot shaft. A housing is provided which defines an aperture for receiving the shaft. The housing has an upper rib adapted to cooperate with the first clip and has a lower rib adapted to cooperate with the second clip. The housing enables the visor to pivot in a first plane between the storage position in a first use position. A block is provided which is adapted to receive the housing when the first clip and the second clip are securely fastened about the pivot shaft. The block has a barrel affixed thereto and projecting therefrom which is seated within the visor bore so as to enable the visor to pivot in a second plane about the block between the first use position overlaying the windshield and a second use position overlaying an adjacent side window.

A further object of the present invention is to provide a mounting system for use in combination with a vehicle visor. A mounting bracket is provided which is affixed to the vehicle for supporting a visor such that the mounting bracket has an immovable pivot shaft extending therefrom. A fastening means is provided for fastening the visor to the pivot shaft. A block is provided which is adapted to receive the fastening means such that the block enables the visor and the block to pivot about the pivot shaft in a first plane between a storage position and a first use position. A retaining means is provided for pivotally retaining the block within the visor to enable the visor to pivot relative to the block in a second plane generally perpendicular to the first plane between the first use position and a second use position.

A feature of the present invention is to provide a block which cooperates with the mounting bracket to enable pivotal movement of the block and the visor relative to the pivot shaft between a storage position and a first use position and enabling pivotal movement of the visor relative to the block between the first use position and a second use position, by utilizing a mounting bracket fixedly mounting the pivot shaft to the vehicle.

An advantage of the present invention is to provide a block enabling pivotal movement of the visor relative to the block between the first use position and the second use position thereby avoiding a complicated and expensive mounting bracket assembly which enables the pivot shaft to pivot.

The above objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a partial view of the mounting system partially cut-away taken along line 5—5 of FIG. 1 showing the visor when in the storage position;

FIG. 6 is a cross-sectional view taken along line 6—6 of FIG. 5 showing the positioning of the first clip relative to the pivot in the detent position when the visor is in the storage position;

FIG. 7 is a cross-sectional view taken along the line 7—7 of FIG. 5 when the visor is in the storage position;

FIG. 8 is a view of the mounting system shown in FIG. 5 showing the housing when the visor is positioned in either the first and second use positions; and FIG. 9 is a cross-sectional view taken along line 9—9 of FIG. 8 showing the positioning of the first clip relative to the pivot shaft when the visor is positioned in either of the first and second use positions.

DETAILED DESCRIPTION OF THE INVENTION

The preferred embodiment illustrated in FIGS. 1-9 shows a mounting system, generally indicated at 10. In the preferred embodiment, the mounting system 10 has a visor 12, a mounting bracket 14 and a block 16.

Figure 1:
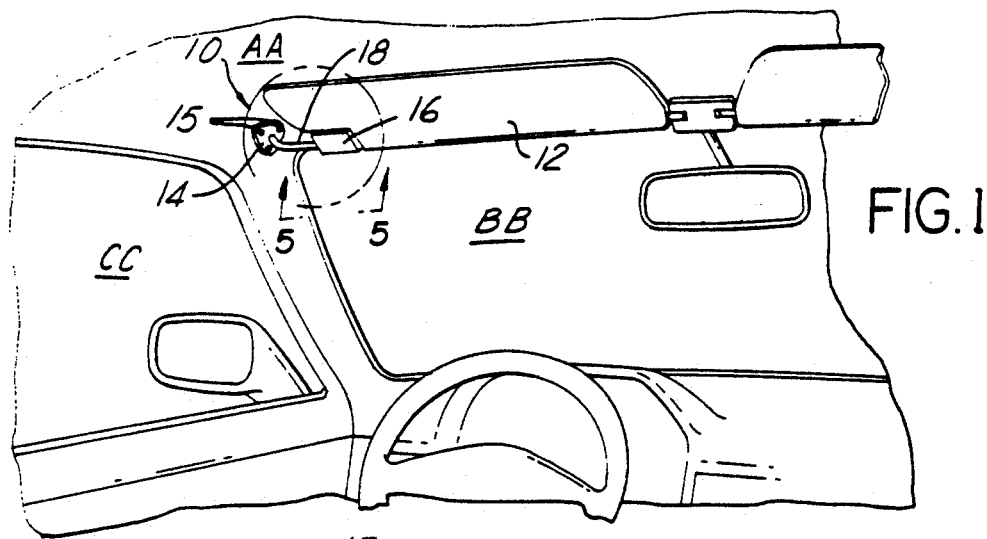
FIG. 1 is a perspective view of the interior of a vehicle showing the visor in a storage position in accordance with the present invention.
Figure 2:
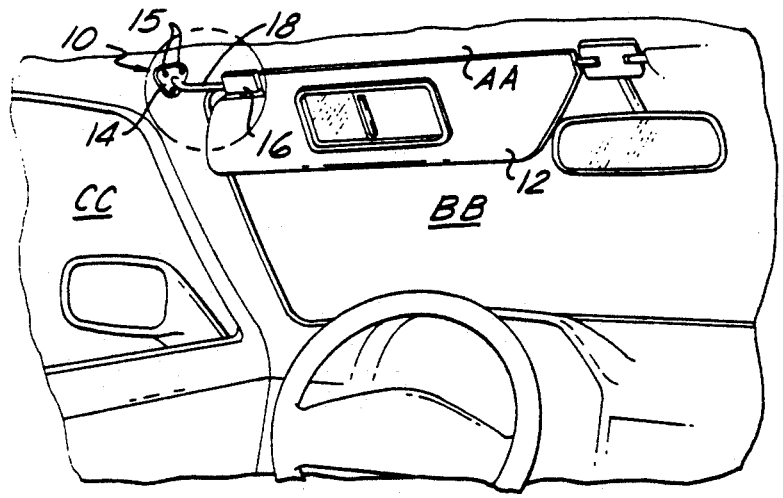
FIG. 2 is a view similar to that shown in FIG. 1 showing the visor in a first use position overlaying the windshield.
Figure 3:
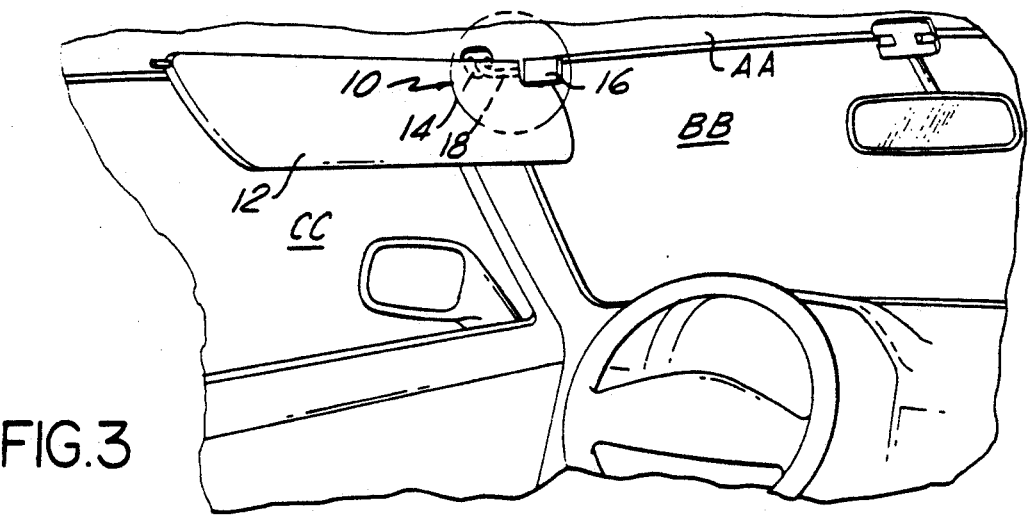
FIG. 3 is a view similar to that shown in FIG. 1 showing the visor in a second use position overlaying an adjacent side window.

As shown in FIGS. 1-3, the mounting bracket 14 is generally triangular in shape and is affixed to a headliner AA of the vehicle by means of a plurality of screws 15 or the like. An immovable pivot shaft 18 is affixed to the mounting bracket 14 and extends outwardly therefrom. In the preferred embodiment shown in FIGS. 1-9, the pivot shaft 18 is generally L-shaped. However, it is possible to utilize a straight pivot shaft (not shown) rather than the generally L-shaped pivot shaft 18 described in the preferred embodiment.

Figure 4:
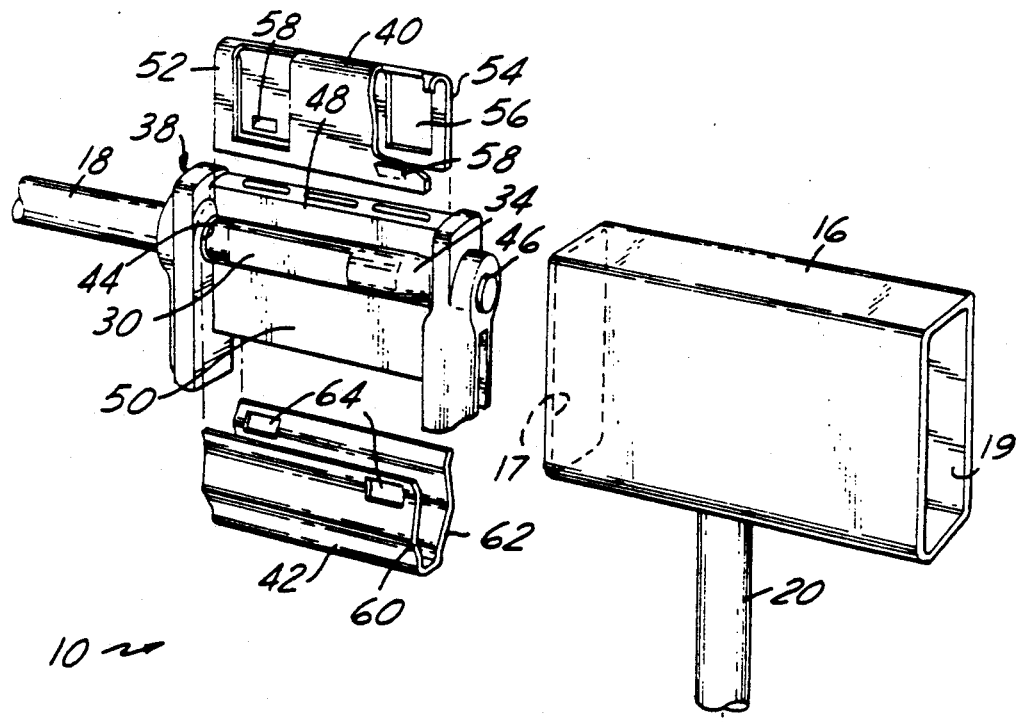
FIG. 4 is an exploded perspective view partially cut-away showing the major elements of the present invention.
Figure 4:
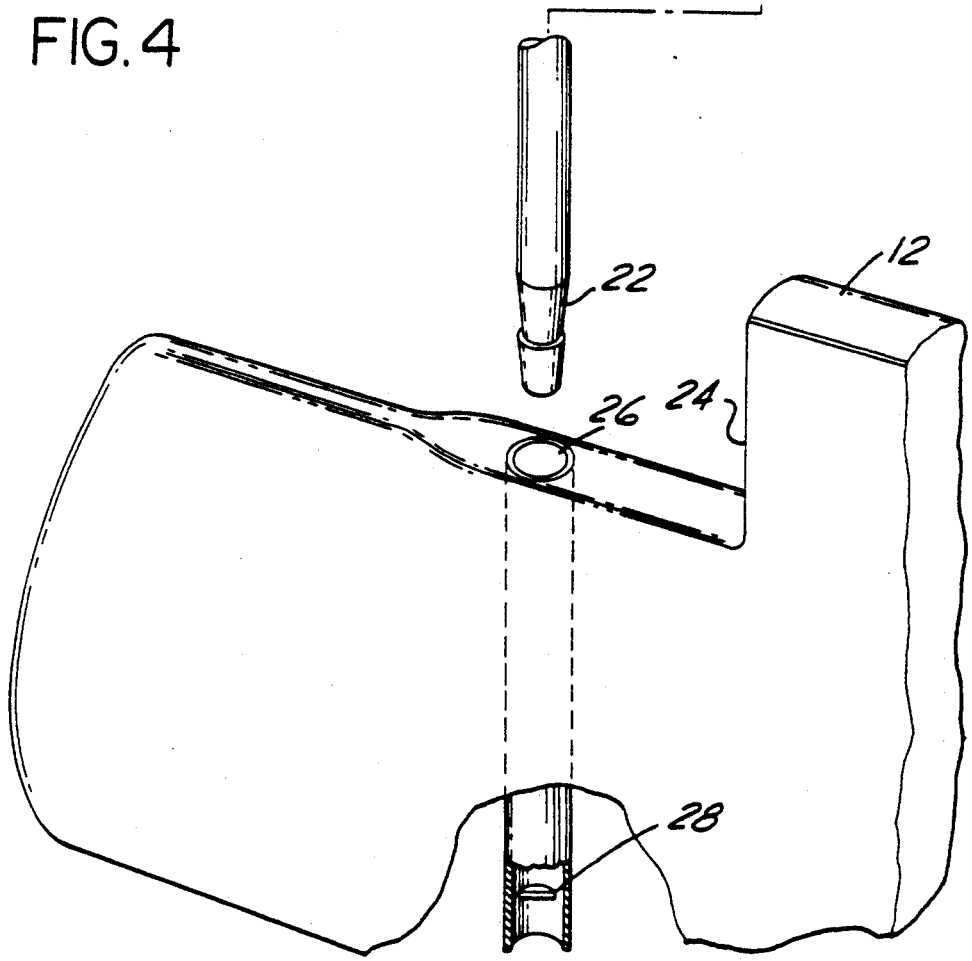

As shown in FIG. 4, the block 16 is generally rectangular in shape. The block 16 is generally hollow having open first and second ends 17, 19. A barrel 20 is affixed to the block and projects outwardly therefrom. The barrel has a tapered section 22 adjacent the free end of the barrel.

As shown in FIGS. 1-4, the visor 12 defines a cut-out 24 on that portion of the visor adjacent the mounting bracket 14. The cut-out 24 is adapted to accommodate the block 16 enabling the visor 12 to lay generally in the plane of the headliner AA when the visor is in the storage position. The cut-out 24 defines a bore 26 which runs generally perpendicular to the longitudinal axis of the visor. Bore 26 is adapted to pivotally receive the barrel 20 of the block 16. An indentation 28 is located within the bore 26 which cooperates with a shoulder in the tapered section 22 of the barrel in order to pivotally retain the barrel 20 within the bore 26 to enable the visor 12 to pivot relative to the block 16 between the first use position shown in FIG. 2 and the second use position shown in FIG. 3.

As shown in FIGS. 4-6, 8 and 9 the pivot shaft 18 has a first flat surface 30 and a second flat surface 32 located on opposite sides and opposite ends of the pivot shaft. The pivot shaft 18 also has a tapered end 34 and an annular groove 36 which is located opposite the tapered end 34.

As best shown in FIGS. 4-6, 8 and 9, the pivot shaft 18 cooperates with a housing 38 and is secured thereto by a first clip 40 and a second clip 42. Once the pivot shaft 18 is pivotally secured within the housing 38, the housing and pivot shaft are inserted within the block 16 for mounting the visor 12 to the mounting bracket 14. The housing 38 has a first aperture 44 and a second aperture 46 located at opposite ends of the housing 38. The first aperture 44 is relatively larger in diameter than the second aperture 46. The second aperture 46 has a diameter which is adapted to receive the tapered end 34 of the pivot shaft 18 but which prevents the remainder of pivot shaft 18 from being inserted within the second aperture 46 to prevent axial movement of the visor 12 relative to the pivot shaft 18 in a first direction. The housing 38 also has an upper ridge 48 which cooperates to properly seat the first clip 40. A lower ridge 50 is provided on the housing 38 to properly seat the second clip 42.

The first clip 40 is generally U-shaped and has a first leg 52 and a second leg 54. Each of the first leg and the second leg have a cut-out 56 and a tang 58 located at opposite sides and opposite ends of their respective first leg and second leg. The second clip 42 is also generally U-shaped and has a first leg 60 and a second leg 62. A catch 64 is located at opposite ends of the second clip, first leg 60 and the second clip, second leg 62 so as to correspond with the tang 58 located on the first clip, first leg 52 and the first clip, second leg 54 so as to pivotally affix the pivot shaft 18 within the housing 38. Annular groove 36 cooperates with the internal surface of the tang 58 for limiting axial movement of the visor 12 relative to the pivot shaft 18 in a second direction.

Once the first clip 40 and the second clip 42 have secured the pivot shaft 18 within the housing 38, the entire sub-assembly is inserted within the block 16 for mounting the visor 12 to the vehicle. The block is configured to snugly receive and contain the sub-assembly during operation of the visor between positions. This self-contained sub-assembly presents an appealing appearance to the vehicle occupants.

In operation, pivot shaft 18 is inserted within the housing 38. The first clip and second clip are then mounted on the housing 38 around the pivot shaft 18. The sub-assembly is then inserted within the block 16 which is mounted to the visor 12. In normal operation, the visor overlays the headliner AA in the storage position such that the detent is located to retain the visor in the storage position as shown in FIG. 1. To shield against glare entering through the windshield BB, the block 16 and the visor 12 are pivoted about the pivot shaft 18 so as to overlay the windshield BB as shown in FIG. 2. To shield against glare entering the adjacent side window CC, the visor 12 is pivoted relative to the block 16 by having the visor 12 pivot about the barrel 20 so as to overlay the adjacent side window CC as shown in FIG. 3. The visor 12 has a flexible end portion 13 which enables the visor 12 to overlay the adjacent side window CC in response to movement of the visor about the block 16. The effective length of the visor overlaying the adjacent side window CC is slightly reduced because of the pivoting of the visor about the block rather than the pivot shaft 18 pivoting about the mounting bracket 14. This slight reduction in effective length of the area covered by the visor 12 results in significant glare protection while still allowing the vehicle operator to look out of the rear portion of the side window CC when desired, such as to ensure that there is no car in his blind spot.

While the preferred embodiment and alternative embodiments of the invention have been described in detail, those familiar with the art to which this invention relates will recognize various alternative designs and embodiments for practicing the invention as defined by the following claims.

What is claimed is:

1. A mounting system in combination with a vehicle visor movable between a storage position and first and second use positions, the system comprising:
   a mounting bracket adapted to be affixed to the vehicle for supporting the visor, the mounting bracket having an immovable pivot shaft extending therefrom;
   a block having a barrel pivotably connecting the visor thereto enabling pivotal movement of the visor relative to the block between the first use position and the second use position; and
   means for pivotably connecting the block to the immovable pivot shaft enabling pivotal movement of the block and the visor relative to the pivot shaft between the storage position and the first use position.

2. The mounting system of claim 1 wherein the storage position is located in a first plane and the first and second use positions are located in a second plane generally perpendicular to the first plane.

3. The mounting system of claim 1 wherein the pivot shaft includes a flat surface located on one side of the pivot shaft, the flat surface providing a detent position when the visor is located in the storage position.

4. The mounting system of claim 3 wherein the pivot shaft has a pair of flat surfaces located on opposed sides of the pivot shaft and opposite ends thereof to provide the detent position for the visor in the storage position.

5. The mounting system of claim 1 wherein the block further includes fastening means for securely fastening the pivot shaft to the block, and the block having retaining means for pivotally retaining the block within the visor allowing pivotal movement therebetween.

6. The mounting system of claim 5 wherein the fastening means further comprises:
   a first clip cooperating with the pivot shaft and the visor, the first clip having a first leg and a second leg, one of the first leg and the second leg defining a cutaway cooperating with the pivot shaft to obtain the detent position when the visor is in the storage position;
   a second clip cooperating with the first clip to securely fasten the first clip about the pivot shaft; and
   a housing defining an aperture for receiving the pivot shaft, the housing having an upper rib adapted to cooperate with the first clip and the housing having a lower rib adapted to cooperate with the second clip, such that the housing enables the visor to pivot in the first plane between the storage position and the first use position.

7. The mounting system of claim 6 wherein the block retains the first clip, the second clip and the housing to form a self-contained sub-assembly having an appealing exterior appearance.

8. The mounting system of claim 5 wherein the retaining means further comprises the visor defining a bore therein, the bore is mounted generally perpendicular to the pivot shaft, and a barrel is affixed to and extends from the block, the barrel is adapted to be received within the visor bore for pivotal movement therein enabling the visor to pivot relative the block between the first use position and the second use position.

9. The mounting system of claim 8 wherein the retaining means further includes the barrel having an annular groove cooperating with an indentation for pivotally retaining the barrel.

10. The mounting system of claim 1 wherein the visor defines a cutout adapted to cooperate with the block enabling the visor to be in axial alignment with a vehicle headliner when the visor in is the storage position and enabling the visor to pivot relative to the block between the first use position and the second use position.

11. The mounting system of claim 1 wherein the block is generally rectangular in shape and has a first end and a second end adapted for receiving the fastening means.

12. A mounting system in combination with a vehicle visor, the mounting system comprising:
   a visor having a cutout located therein and the cutout defining a bore;
   a pivot shaft having a generally circular cross section, the shaft cooperating with the visor, and the shaft having a flat surface located on one side of the shaft, the flat surface providing a detent position for locating the visor in a storage position;
   a first clip cooperating with the shaft and the visor, the first clip having a first leg and a second leg, one of the first leg and the second leg defining a cutaway cooperating with the flat surface to locate the flat surface to obtain the detent position when the visor is in the storage position;
   a second clip cooperating with the first clip to securely fasten the first clip about the pivot shaft;
   a housing defining an aperture for receiving the shaft, the housing having an upper rib adapted to cooperate with the first clip and the housing having a lower rib adapted to cooperate with the second clip, such that the housing enables the visor to pivot in a first plane between the storage position and a first use position; and
   a block adapted to receive the housing when the first clip and the second clip are securely fastened about the pivot shaft, the block having a barrel affixed thereto and projecting therefrom, the barrel pivotally seated within the visor bore so as to enable the visor to pivot in a second plane about the block between the first use position overlaying a windshield and a second use position overlaying an adjacent side window.

13. The mounting system of claim 12 wherein the pivot shaft includes a pair of flat surfaces located on opposing sides of the pivot shaft.

14. The mounting system of claim 12 wherein the block includes a first end and a second end adapted to receive the first clip, the second clip, and the housing, enabling pivotal movement of the visor in the first plane about the pivot shaft and enabling movement of the visor relative the block in a second plane.

15. The mounting system of claim 12 wherein the pivot shaft has a L-shaped configuration which extends from the mounting bracket to cooperate with the block.

16. The mounting system of claim 12 wherein the first clip defines a tang in one of the first leg and the second leg.

17. The mounting system of claim 12 wherein the second clip defines a catch in one of the first leg and the second leg cooperating with the corresponding first leg and second leg of the first clip for securely fastening the second leg to the first leg.

18. The mounting system of claim 12 wherein the housing defines a first aperture and a second aperture such that the second aperture is smaller than the first aperture so as to cooperate with the pivot shaft to prevent axial movement of the visor relative to the pivot shaft in first direction.

19. The mounting system of claim 12 wherein the pivot shaft includes an annular groove located distal from the head cooperating with the first clip to limit axial movement of the visor relative the pivot shaft in a second direction.

a mounting bracket affixed to the vehicle for supporting a visor and the mounting bracket having a pivot shaft immovably extending therefrom;
fastening means for pivotally fastening the visor to the pivot shaft;
a block adapted to receive the fastening means, the block enabling the visor and the block to pivot about the pivot shaft in a first plane between a storage position and a first use position; and
retaining means for pivotally retaining the block within the visor enabling the visor to pivot relative to the block in a second plane generally perpendicular to the first plane between the first use position and a second use position.

* * * * *